(12) United States Patent
Weindorf et al.

(10) Patent No.: US 7,585,408 B2
(45) Date of Patent: Sep. 8, 2009

(54) LIQUID FILTER

(75) Inventors: Martin Weindorf, Kornwestheim (DE); Thomas Storch, Murr (DE); Harald Zeiher, Loechgau (DE)

(73) Assignee: Mann + Hummel GmbH, Ludwigsburg (DE)

( * ) Notice: Subject to any disclaimer, the term of this patent is extended or adjusted under 35 U.S.C. 154(b) by 561 days.

(21) Appl. No.: 11/167,272

(22) Filed: Jun. 28, 2005

(65) Prior Publication Data

US 2006/0011524 A1    Jan. 19, 2006

(30) Foreign Application Priority Data

Jun. 28, 2004  (DE) .................. 10 2004 031 209

(51) Int. Cl.
*B01D 17/12*  (2006.01)
*B01D 35/30*  (2006.01)

(52) U.S. Cl. .................. 210/86; 210/97; 210/232; 210/248; 210/443; 210/450; 210/95; 55/490; 123/196 A; 184/6.24

(58) Field of Classification Search .................. 210/86, 210/97, 104, 232, 234, 235, 248, 427–429, 210/440, 443, 444, 445, 450, 451, 94, 95, 210/167.02; 55/428, 430, 490, 492; 123/196 A; 184/6.24
See application file for complete search history.

(56) References Cited

U.S. PATENT DOCUMENTS

| 3,144,405 | A | | 8/1964 | Beinke | |
|---|---|---|---|---|---|
| 3,724,665 | A | | 4/1973 | Hall | |
| 4,502,956 | A | * | 3/1985 | Wilson et al. | 210/248 |
| 4,740,299 | A | * | 4/1988 | Popoff et al. | 210/232 |
| 6,139,738 | A | * | 10/2000 | Maxwell | 210/248 |
| 6,485,637 | B2 | | 11/2002 | Jainek et al. | |
| 6,616,838 | B1 | * | 9/2003 | Harris | 210/233 |
| 6,790,356 | B2 | * | 9/2004 | Wright et al. | 210/248 |
| 6,811,694 | B2 | * | 11/2004 | Jainek | 210/248 |
| 7,060,184 | B2 | * | 6/2006 | Cline et al. | 210/248 |

FOREIGN PATENT DOCUMENTS

| DE | 23 50 344 A1 | 4/1975 |
|---|---|---|
| DE | 24 60 073 A1 | 7/1976 |
| DE | 29 37 745 A1 | 4/1980 |
| DE | 3436154 C2 | 10/1986 |
| DE | 3640531 C1 | 9/1987 |
| DE | 39 41 996 A1 | 6/1991 |
| DE | 44 22 531 A1 | 3/1995 |
| DE | 195 41 965 C1 | 2/1997 |
| DE | 199 61 580 A1 | 6/2001 |
| EP | 0 269 054 A2 | 6/1988 |
| EP | 0 720 862 A1 | 7/1996 |
| EP | 1 151 783 A2 | 11/2001 |
| EP | 1 400 270 A1 | 3/2004 |

* cited by examiner

*Primary Examiner*—Joseph W Drodge

(57) ABSTRACT

A liquid filter, particularly for the lubricating oil of an internal combustion engine, having at least one replaceable filter and a carrier module, in which the replaceable filter has a housing with an inlet and an outlet for the liquid to be filtered; a housing vessel with an opening pointing essentially downward is provided, and a filter medium is arranged in the housing between the inlet and outlet in a sealed manner. The replaceable filter with the opening pointing downward is attached in a sealed manner to the carrier module, and the carrier module has semiautomatic emptying device for the replaceable filter such that emptying of the replaceable filter is initiated by an external operation which opens a drain passage, and the drain passage is automatically closed again after the emptying process is completed.

21 Claims, 4 Drawing Sheets

LIQUID FILTER

BACKGROUND OF THE INVENTION

The present invention relates to a liquid filter, in particular for the lubricating oil of an internal combustion engine, comprising at least one replaceable filter and a carrier module.

When a liquid filter element is changed, there is often the problem of residential fluid leading into the environment when screwing open the cover or when exchanging the replaceable filter. This is especially critical with replaceable filters which are installed upright, i.e., with the opening facing downwardly.

U.S. Pat. No. 6,485,637 (=DE 199 61 580) discloses a liquid filter with an outlet for liquid residues. The liquid filter, in particular an oil filter for the lubricating oil for an internal combustion engine, has a suspended housing with a replaceable filter element arranged in it. At the lowest point in the housing vessel, a drain opening is arranged and is automatically opened when the housing vessel is screwed open, whereupon the oil escapes through the drain opening and must be collected in a separate housing.

U.S. Pat. No. 3,724,665 discloses a replaceable oil filter that is positioned upright, i.e., oriented with the opening facing downwardly. The filter housing and filter element are fixedly joined together so that both must be replaced when the filter is changed. To prevent oil equal to the total volume content of the replaceable filter from running out of the housing onto the threaded mounting flange when the filter that is to be replaced is unscrewed, a hollow cylinder is arranged in the interior of the replaceable filter, extending axially and concentrically with the filter element over almost the entire height of the replaceable filter. The oil present in the interior of the hollow cylinder is returned back to the oil circulation when the filter is changed and thus reduces the absolute quantity of oil which escapes. One disadvantage here is that despite the fact that the quantity of oil is reduced, the oil volume that is still present and runs out must be collected in some fashion for environmental reasons. In addition, the escaping oil causes heavy contamination of the threaded mounting flange and any units that might be situated beneath it.

SUMMARY OF THE INVENTION

The object of this invention is to provide an improved liquid filter with a replaceable filter element and a carrier module.

Another object is to provide a liquid filter with a replaceable filter element which stands upright, is easy to empty, inexpensive to construct and is just as reliable and simple to operate.

A further object of the invention is to provide a liquid filter which largely prevents oil contamination due to the exchange of the replaceable filter element.

These and other objects are achieved in accordance with the present invention by providing a liquid filter comprising at least one replaceable filter and a carrier module, the replaceable filter having a housing with an inlet and an outlet for a liquid to be filtered, the housing comprising a housing vessel having a downwardly oriented opening attached to the carrier module in a sealed manner, and the replaceable filter comprising a filter medium arranged in a sealed manner in the housing between the inlet and the outlet, the liquid filter further comprising a semiautomatic emptying device for the replaceable filter which opens at least passage to empty the replaceable filter when prompted by an external operation and automatically closes the at least one passage after the replaceable filter has been emptied.

In accordance with a further aspect of the invention, the objects are achieved by providing a liquid filter comprising at least one replaceable filter having a housing with an inlet and an outlet for the fluid to be filtered, the housing comprising a housing vessel with a downwardly oriented opening sealingly attached to an underlying carrier module, the replaceable filter comprising a filter medium arranged in a sealed manner in the housing between the inlet and outlet, wherein the carrier module comprises an externally actuatable emptying device operable in a first operation to open a passage to empty the replaceable filter and in a second operation to close the passage after the replaceable filter has been emptied.

The invention thus relates to a liquid filter, in particular for the lubricating oil of an internal combustion engine, comprising at least one replaceable filter and a carrier module connected thereto. The replaceable filter has a housing with an inlet and an outlet for the liquid to be filtered, a part of the housing being formed by a housing vessel which is oriented with the opening facing downwardly. A filter medium is arranged in a sealed manner in the housing between the inlet and the outlet, and the replaceable filter having its opening pointing essentially downward being attached in a sealed manner to the carrier module. The housing vessel in this case is preferably cylindrical in design, but it may also have other basic shapes and the filter medium is preferably a hollow cylinder with zigzag pleating made of a paper or a synthetic filter medium. The opening in the housing vessel is closed and sealed with an end cover, whereby the end cover is preferably inseparably or permanently attached to the housing vessel. The inlet and outlet openings described above are arranged in the end cover and the end cover also has a sealing medium, preferably an axial seal, to seal the connection between the replaceable filter and the carrier module. The inlet and outlet lines for the liquid passing through the liquid filter are arranged in the carrier module. According to this invention, the carrier module includes a device for semiautomatically emptying the replaceable filter such that almost complete emptying of the replaceable filter with the carrier module is accomplished by an external operation which opens a passage, and this passage is automatically closed again after the emptying process is completed. The carrier module which accommodates the replaceable filter may additionally contain other functional elements such as an oil cooler, a bypass filter or a centrifuge and additionally serves to mount the filter assembly to the engine or in the engine compartment, whereby it also serves to connect the functional elements into the liquid circuit. To avoid leakage of liquid present in the replaceable filter when exchanging the replaceable filter, the liquid there advantageously can be drained out through the semiautomatic emptying device of the replaceable filter into an unpressurized area, e.g., the crankcase or the oil pan of the oil system. Here, the semiautomatic emptying device of the replaceable filter is operated via an externally applied force so that corresponding channels are opened in the interior of the carrier module. To prevent engine damage, the passage thus opened is automatically closed again when the internal combustion engine is started up to ensure filling of the replaceable filter and thus resumption of filtration and restoration of the liquid circulation.

The liquid filter according to the invention has the advantages that first, leakage of the fluid stored in the replaceable filter is avoided when unscrewing the replaceable filter and thus contamination of the carrier module, the engine components situated around the carrier module and environmental pollution are prevented on the one hand, while on the other hand, the automatic reclosing of the passage permits an immediate pressure buildup in the liquid circuit and thus prevents engine damage that might be caused, e.g., due to forgetting to reclose the passage. In addition, this avoids the need for a back flow check valve in the replaceable filter.

In accordance with one advantageous embodiment of the invention, the semiautomatic emptying device comprises an axially moveable piston rod which seals a channel inside the carrier module via a sealing member provided on the piston rod. The sealing member is correspondingly attached to the piston rod, but it need not be directly fixed to the piston rod. Axial displacement of the piston rod within the carrier module opens and/or closes the channel so that the replaceable filter is emptied. The piston rod is preferably constructed as a round lathed part and thus can be manufactured easily and inexpensively.

As an alternative to the arrangement described above, the sealing member on the piston rod advantageously may be replaced with a radial gap seal. By maintaining narrow tolerances between the piston rod, the groove running in the piston rod and the housing wall, an adequate sealing effect may be obtained even without a sealing member. With specially designed tolerances, the peripheral groove in the piston rod also may be omitted.

In one particularly advantageous embodiment of the inventive concept, the unfiltered side and the filtered side of the replaceable filter and a unpressurized fluid drain are separated from one another in a sealed manner by the semiautomatic emptying device during operation of the internal combustion engine. When the internal combustion engine is stopped, then upon actuation of the emptying device, the unfiltered side and the filtered side of the replaceable filter are connected to the unpressurized drain, so that filtered and unfiltered liquid present in the replaceable filter element and in a part of the carrier module are drained out in a controlled manner through the unpressurized drain. In the case of an oil filter, the unpressurized drain is preferably connected to the crankcase, so that the oil present in the replaceable filter element and in part of the carrier module can flow back into the oil pan without polluting the environment. This achieves the result that when the replaceable filter is unscrewed, oil does not unnecessarily run out of the replaceable filter onto the carrier module and thereby contaminate the environment.

It is advantageous to construct the semiautomatic emptying device to be operable manually without the use of a tool or application of other external force. This may be accomplished, for example, by equipping the piston rod with a pull handle of any desired design, so that simply pulling on the handle opens the respective connections and consequently starts the emptying of the replaceable filter. The forces required for operation should be kept to a minimum so that it can be accomplished easily, without necessitating any additional supportive electric, hydraulic or pneumatic force.

In accordance with an alternative embodiment of this invention, the semiautomatic emptying device is operatively connected to an actuator for the purpose of actuation, whereby the actuator initiates operation of the emptying device whenever an appropriate input signal is received. The actuator may be an electric motor mounted in the carrier module or outside on the carrier module, or it may be a pneumatic or hydraulic drive which can be operated by a switch mounted on the outside of the actuator or by a switch operated in the interior of the motor vehicle.

Another conceivable possibility would be for a signal for emptying the replaceable filter to be relayed directly to the actuator through the operation of releasing the replaceable filter, whereby the signal here must be emitted after a fraction of the rotational movement for releasing the replaceable filter has been carried out, and the releasing operation may be continued only after the replaceable filter has been completely emptied. After the emptying operation has been completed, the replaceable filter may be removed, e.g., after a certain predefined interval of time or based on an additional sensor signal. It also is then necessary to assure that the emptying means can be returned to the initial, closed state.

In accordance with one embodiment of the invention, the semiautomatic emptying device separates at least two areas within the carrier module from one another in a sealed manner, whereby a first area communicates with the ambient environment and a second area is charged with or acted upon by liquid. When the emptying device is actuated, the first area is subjected to ambient pressure, i.e., there is a direct connection from the first area into the area surrounding the carrier module, and the second area of the carrier module is filled with liquid, which, however, is not under pressure because the internal combustion engine is stopped so that the oil pump is not being driven.

When the internal combustion engine is started up again after the filter has been emptied and exchanged and the oil pump in the internal combustion engine generates an oil pressure again in the oil system, then a hydraulic oil pressure builds up in the second area which automatically resets the emptying device against the low ambient pressure of the first area back into the closed starting position. Due to the possibility of direct communication between the first area and the ambient environment, the unpressurized gas volume stored in the first area can be discharged again directly to the environment and no back pressure is built up. This construction assures that after the internal combustion engine has been started, the newly installed replaceable filter automatically will be filled up so that there will be no interruption in engine lubrication. Due to the automatic re-closing of the emptying device, errors, e.g., due to forgetting the manual closing, and the resulting damage to the internal combustion engine can be avoided easily and without any great effort.

An alternative solution for automatic reclosing of the emptying device may be to provide a spring on the semiautomatic emptying device arranged such that when the emptying device is operated to empty the filter and support module, the emptying device is then subjected to a spring force which acts to automatically reset the emptying device and thereby closes the passages at the end of the emptying operation. To do so, the emptying device must be continuously acted upon by a counterforce exerted against the spring force during the entire duration of the emptying process in order to assure complete emptying of the replaceable filter. Here again, after emptying, it is assured that an immediate pressure buildup in the fluid system will occur when the internal combustion engine is subsequently started up again.

In accordance with an alternative embodiment of the liquid filter which comprises a replaceable filter of the type described above and a suitable carrier module, the carrier module may comprise a device for emptying the replaceable filter such that by means of an external actuation, a passage for emptying the replaceable filter is opened, and after the emptying process, the passage is closed again with a seal by renewed manual actuation. This is a simple variant of the liquid filter of the invention in which the liquid filter is manually emptied by applying an external actuation and then after the filter is emptied but before starting the internal combustion engine, the emptying device for the replaceable filter must be returned back to the closed starting position again by a second external operation, e.g. a second manual actuation.

To prevent faulty operation or forgetting to close the emptying device again, it is possible to provide a sensor which emits a warning signal in the event the emptying device has not been closed and an attempt is made to start up the internal combustion engine. The signal indicates either visually and/or acoustically to the operator that the emptying device has not been closed and may even be configured to prevent startup of the internal combustion engine until the sensor detects that the emptying device has been closed.

In accordance with one embodiment of the invention, the device for emptying the replaceable filter is an outlet screw or drain plug, which is screwed into the carrier module from the outside and separates certain chambers that are exposed to fluid in the interior of the carrier module from one another in a sealed manner in such a way that these fluid-exposed chambers can be connected to a drain system when the drain plug is axially displaced. This outlet screw is preferably configured for manual operation, i.e., it has a knurled nut or knob, for example, in the area outside of the carrier module. The screw can be turned by hand with the help of this knurled knob and can thus be displaced axially to open and/or closed the drain passages. However, it is likewise possible for this screw to be operated by a pneumatic, hydraulic or electromotor system and to achieve the opening and closing via a switch or a combination of switches.

The outlet screw or drain plug in the carrier module advantageously has an axial seal on the end to separate the filtered side from the unfiltered side of the replaceable filter; and furthermore, in order to seal the interior of the carrier module relative to the surrounding environment, the outlet screw is provided with a radial seal which is arranged so that it ensures a seal in any operating position of the outlet screw. Thus in the closed state the outlet screw separates the filtered side from the unfiltered side in a sealed manner, and additionally the unpressurized channel leading to the oil pan is also thereby separated from the unfiltered side and the filtered side.

When the outlet screw is loosened and the unfiltered side and filtered side are consequently opened, the oil present in the replaceable filter flows from the unfiltered side and the filtered side together into the channel which leads into the oil pan in an unpressurized stream. Since the outlet screw undergoes a certain axial displacement to release the channels, it is sealed with respect to the carrier module by a radial seal which is arranged on the circumference of the shaft of the outlet screw and therefore assures a secure seal between the carrier module and shaft in both the opened and unopened states.

In accordance with one advantageous embodiment of this invention, the outlet screw has a loss-prevention device with respect to the carrier module such that the screw can be inserted easily without requiring a tool, but once inserted, the screw cannot be separated from the carrier module without destroying it. To this end, the outlet screw may, for example, comprise a flexible area provided out its outer circumference with snap hooks, whereby upon insertion of the screw into the carrier module, these snap hooks are pressed inward by a type of insertion bevel, and the snap hooks then spread apart again and engage in the interior of the carrier module and thus make it impossible for the outlet screw to be pulled out of the carrier module or lost.

It is advantageous to provide an inspection window in the liquid filter in the lower area of the replaceable filter, preferably in the carrier module, such that it is possible to obtain information regarding the liquid level in the replaceable filter by looking through the inspection window. It is thus possible to easily determine whether the replaceable filter and a portion of the carrier module are completely emptied and thus whether the replaceable filter can be unscrewed and exchanged without any loss of liquid. This is the simplest way of making a reliable evaluation of the fluid level in the liquid filter. This inspection window may be made of glass or of a transparent plastic. The interior side of the window which faces the liquid is preferably treated by a type of lotus effect so that dirt particles and residual liquid do not adhere to the inspection window.

In accordance with another embodiment of this invention, a liquid level sensor is provided in the carrier module, and a display is also provided outside of the carrier module such that it is possible to determine the liquid level in the replaceable filter via the display. This can be achieved, on the one hand, via a quasi-digital input/output display, i.e., as soon as the display lights the replaceable filter is empty and as soon as the display is off the filter is full again, or vice versa. It is also possible to provide a concrete indication of the liquid level in percentage or in volume units.

As described above, one embodiment of this invention involves a fluid level sensor again being provided in the carrier module, with the fluid sensor being operatively connected to the emptying device for the replaceable filter such that the emptying device for the replaceable filter can be opened and/or closed in response to a prescribed signal from the liquid sensor. In accordance with the invention, the sensor may be connected to the emptying device such that the replaceable filter is only opened or only closed by a signal from the liquid sensor, or both operations may be initiated by appropriate signals from the liquid sensor. When a signal from a liquid sensor is used to open and/or close the emptying device, it is necessary that there first be an "declaration of intent" by the operator indicating whether or not a filter replacement is to be performed.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawing figures in which.

DETAILED DESCRIPTION OF PREFERRED EMBODIMENTS

Figure 1:
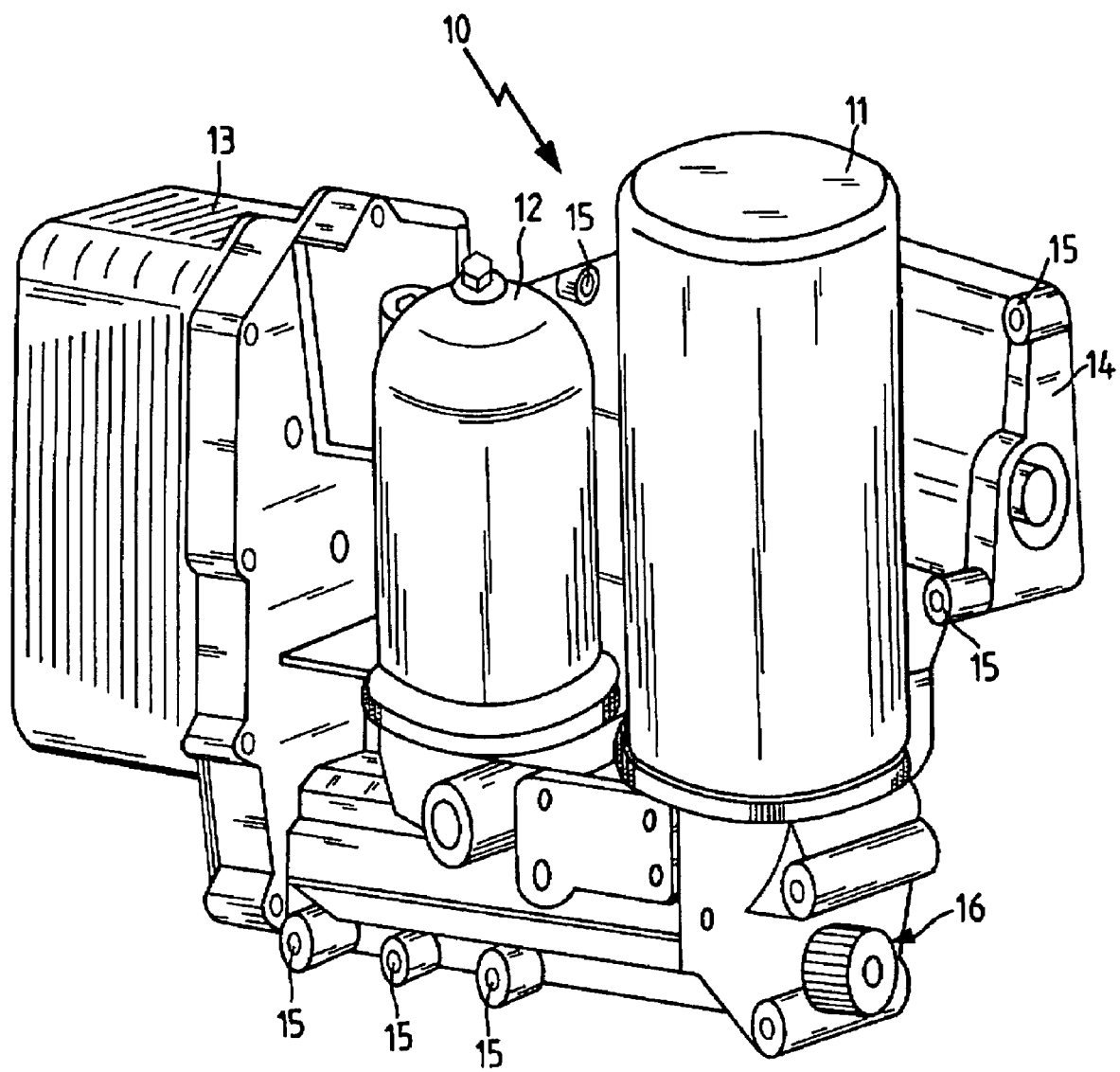
FIG. 1 is a perspective view of a liquid filter according to the invention.

FIG. 1 shows a liquid filter 10 for lubricating oil in an internal combustion engine provided with a replaceable filter 11, a centrifuge 12 and an oil cooler 13, which are arranged on a carrier module 14. Channels (not shown here) are provided in the interior of the carrier module 14 for connecting the individual functional elements 11, 12, 13, but it is sufficient according to the invention to provide only a carrier module 14 with a single replaceable filter 11. The centrifuge 12 is preferably mounted a the bypass of the oil circulation system, and the unfiltered oil stream preferably is cooled down in the oil cooler 13 and then sent directly to the replaceable oil filter 11 for filtering.

Mounting bores 15, with which the carrier module together with the functional elements arranged on it can be flange-connected directly in the engine compartment or to the engine block of the internal combustion engine, are provided on the carrier module 14. The connection with the oil circuit of the engine is effected in the lower area of the carrier module 14 (not shown here). Underneath the replaceable oil filter 11, an outlet screw or drain plug 16 is provided for semiautomatic emptying of the replaceable oil filter 11. The need for such a device is clearly discernible here because otherwise when changing the replaceable oil filter 11, an amount of oil equal to the total volume content of the replaceable oil filter 11 would first be discharged onto the carrier module 14 and then into the environment.

According to this invention, the outlet screw 16 is pulled axially outward to empty the contents of the replaceable oil filter 11 into the crankcase of the internal combustion engine (not shown) before unscrewing the replaceable filter 11. Following emptying of the filter, it is then readily possible to replace the replaceable filter 11 with a new filter without oil running out into the environment.

Figure 2A:
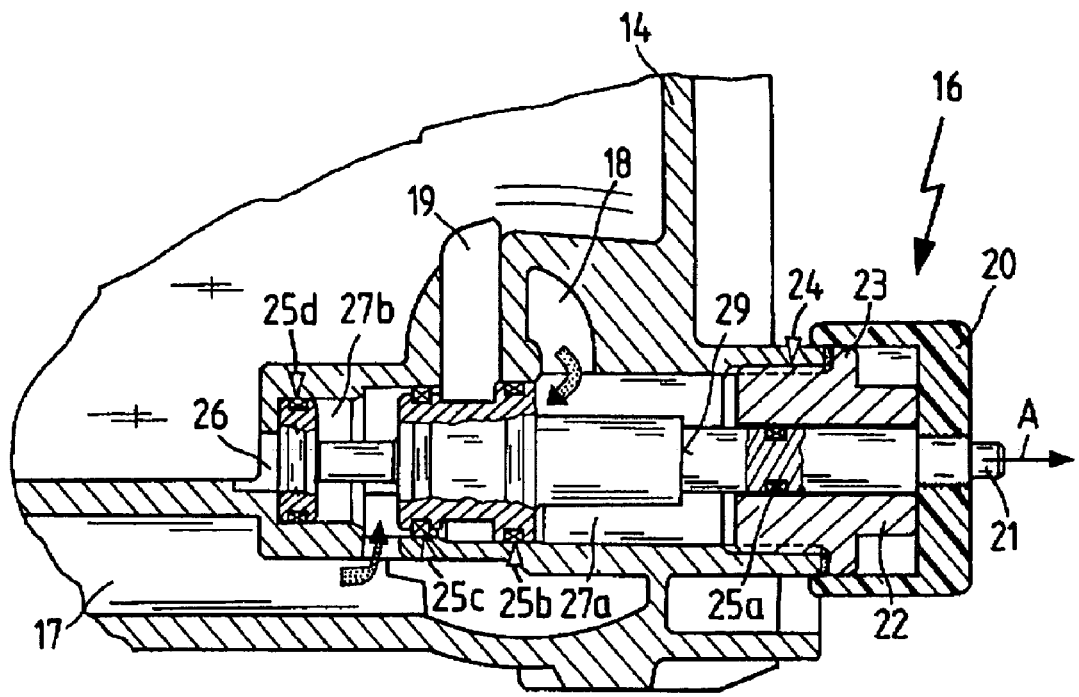
FIGS. 2a and 2b show parts of the liquid filter in a horizontal section in the area of the emptying device in both the open and closed states.
Figure 2B:
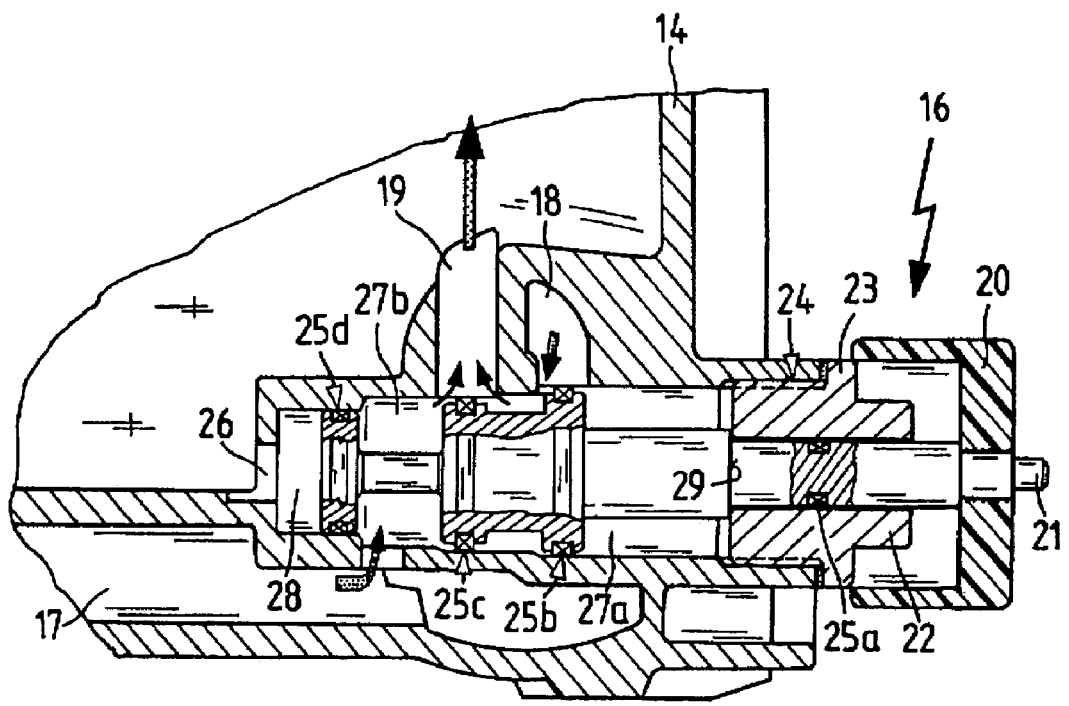

FIGS. 2a and 2b show a horizontal section at the center plane of the outlet screw or drain plug 16 through portion of the carrier module 14 in which the emptying device is located. Components corresponding to those in FIG. 1 are identified by the same reference numerals. The sectional view is viewed from the direction of the replaceable filter 11, i.e., from above.

The carrier module 14 in combination with the outlet screw 16 separates an unfiltered oil chamber 17 and a filtered oil chamber 18 from each other and from a drain 19 which leads to the oil pan of the engine. Outside the carrier module 14 at the other end of the outlet screw 16 there is a knurled knob 20 which is connected to a piston rod 21. The knurled knob 20 is preferably made of plastic and the piston rod 21 is preferably made of a lathed steel member. The connection here may be accomplished by press fit or a glued connection or some other permanent connection known in the state of the art.

The outlet screw 16 is guided in a guide piece 22 which is a hollow cylinder arranged concentrically with the knurled knob 20, whereby the guide piece 22 has a collar 23 extending around the outside and an external thread 24. The collar 23 provides an axial stop relative to the carrier module 14 and the guide piece 22 is secured in the carrier module 14 by the thread 24 which is designed to mate with a thread in the carrier module 14. Sealing between the interior of the carrier module 14 and the external environment may be achieved in the area of the thread 24 using, for example, an adhesive paste or some other sealing medium known in the art.

The piston rod 21 is sealed with respect to the guide piece 22 by an O-ring 25a, which is held in a groove on the piston rod 21. The guide piece 22 should be constructed to be long enough so that the O-ring 25 always remains inside the guide piece 22 in all axial displacement states of the piston rod 21.

The unfiltered oil side 17 is sealingly separated from the filtered oil side 18 and from the drain 19 by additional O-rings 25b, 25c, 25d, which are arranged on the piston rod 21 corresponding to the contour of the carrier module 14 for separation of the two areas 27a and 27b, which are acted upon by the fluid, and the space 28, which is produced by the displacement of the piston rod 21 and which communicates through the passage 26 with the environment so that it is acted upon by ambient pressure. The space 27a receives filtered oil and the space 27b receives unfiltered oil. Crankcase gas at the corresponding crankcase gas pressure is present in the drain channel 19 when the outlet screw or drain plug 16 is closed. Since the areas 27a, 27b are acted upon by the dynamic oil pressure prevailing in the oil circuit, the drain plug remains closed in this state so that these areas remain separated. The arrows indicate the path of the fluid from the filtered side and/or the unfiltered side into the areas 27a, 27b that are acted upon by fluid.

After the engine is stopped to change the replaceable filter 11, the fastening screw 16 is manually screwed out from the carrier module 14 via the knurled knob 20 in the direction "A" until the movement is stopped by engagement between a stop collar 29 on the piston rod 21 and the guide piece 22. Due to this unscrewing and consequent extraction of the outlet screw 16, the areas 27a, 27b are connected to the drain channel 19 so that then the oil can flow out through the drain 19 due to the static pressure prevailing in the replaceable filter 11 above it. The arrows indicate the path of the oil from the unfiltered side and/or the filtered side into the drain 19.

To prevent a reduced pressure in the area 28 that is subjected to ambient pressure, air is drawn in through the passage opening 26 into the resulting area 28. After complete emptying and replacement of the replaceable filter 11, the engine is started which causes a build-up of oil pressure in the areas 27a, 27b that are acted upon by the liquid oil, so that the piston rod 21 is automatically moved again opposite the direction "A" into the closed position. This is possible simply because only the area 28 which is exposed to ambient pressure counteracts the areas 27a, 27b that are exposed to fluid pressure, so the air contained therein can be forced back through the passage 26 into the environment.

Figure 3A:
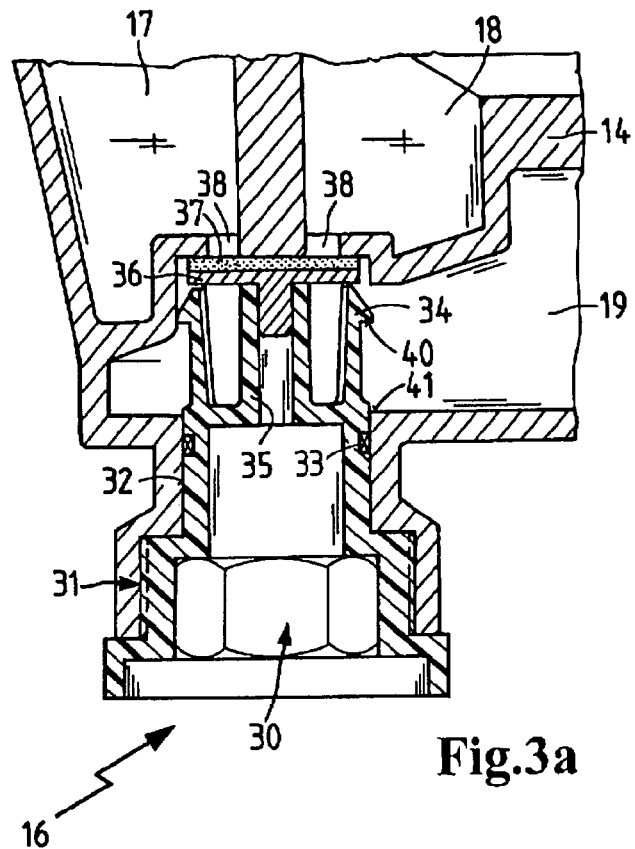
FIGS. 3a and 3b show a vertical section through an alternative embodiment of the liquid filter in the area of the emptying device.
Figure 3B:
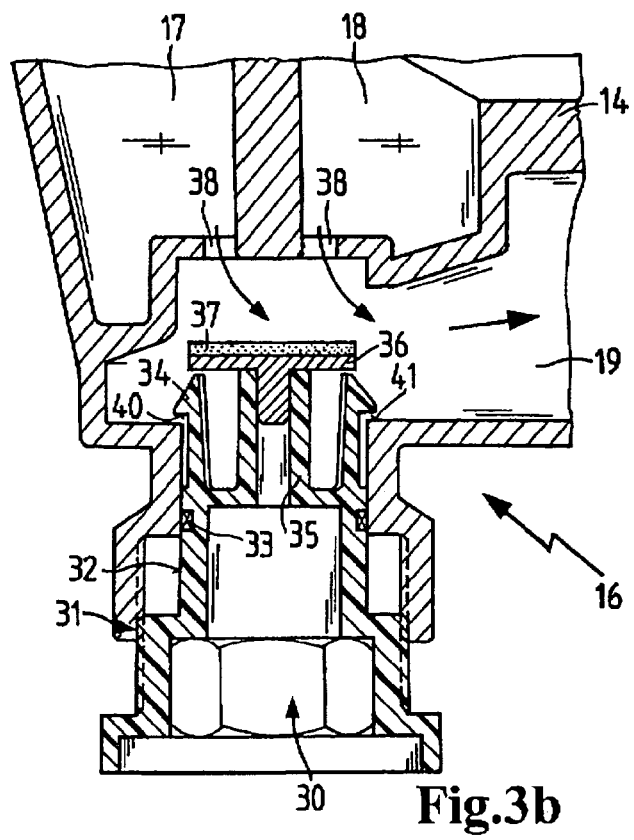

FIG. 3a and FIG. 3b show an alternative form of the emptying system in a vertical section of that portion of the carrier module 14 in which the emptying device is located. Again, components corresponding to those in previous figures are identified by the same reference numerals. The outlet screw or drain plug 16 has an internal hex head recess 30 in the outer area facing out from the carrier module 14 for receiving a corresponding tool for easy loosening and tightening of the screw 16. The outlet screw or drain plug 16 is preferably made of plastic and can be displaced axially by means of a threaded area 31 with which the outlet screw 16 is screwed into the carrier module 14.

Further in the carrier module 14 following an inwardly directed shoulder on the outlet screw 16, there is a sealing area 32 between the drain plug 16 and the carrier module 14, in which sealing is accomplished via an O-ring 33 which is arranged in a groove of the outlet screw 16. Here again, the outlet screw 16 separates an unfiltered oil area 17 from a filtered oil area 18 and a drain channel 19, which also opens into the crankcase and/or into the oil pan of the internal combustion engine.

In approximate extension of the sealing area 32, the drain plug 16 is provided with a plurality of snap hooks 34 which yield inward when the drain plug 16 is inserted into the carrier module 14 and then as soon as they reach the area of the drain channel 19 they spring back into their original position and thus resist complete extraction or loss of the drain plug 16. The lower straight edge 40 of the snap hooks 34 limits the axial movement of the outlet screw 16 by stop contact with an axial shoulder 41 of the drain channel 19.

A holding cylinder 35 extends parallel to the snap hooks 34 into the interior of the drain plug 16 and holds at its end a disk-shaped sealing plate 36. The sealing plate preferably has a diameter of about the same size as the spacing of the snap hooks from one another. In addition, an elastomer gasket 37 is cast or glued onto the sealing plate 36 such that when the outlet screw is tightened, the gasket sealingly closes two drain openings 38 from the unfiltered side 17 and from the filtered side 18, respectively.

When the outlet screw or drain plug 16 is unscrewed as shown in FIG. 3b, the passage openings 38 are released and the contents of the replaceable filter 11 are drained out through the drain channel 19 into the oil pan. Following the draining operation, the outlet screw 16 must be screwed back into the carrier module 14 up to its axial stop after a specified period of time in order to close the passage holes 38 and to ensure an undisturbed buildup of pressure in the oil circuit.

Figure 4:
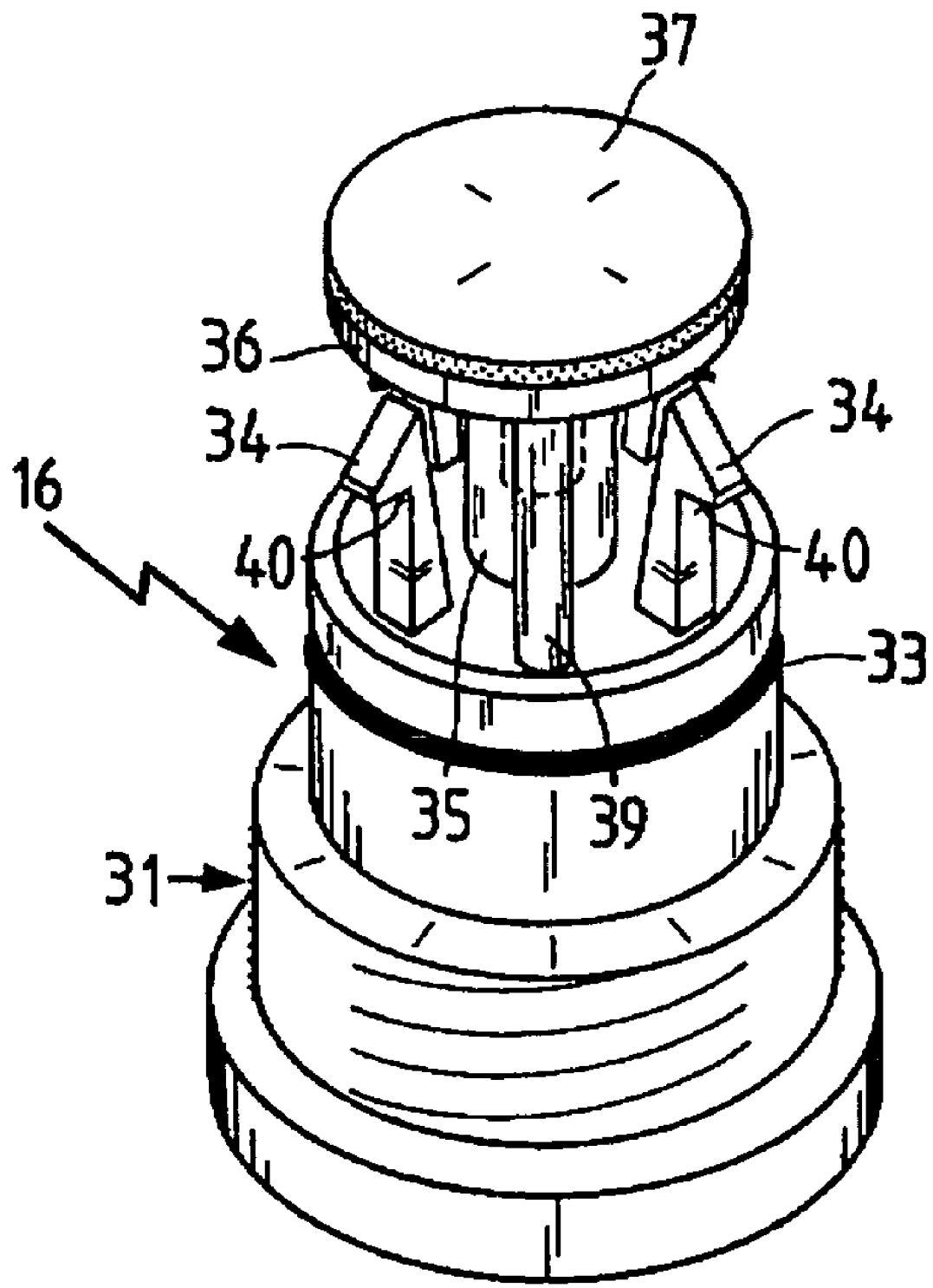
FIG. 4 is a perspective individual view of the outlet screw for the alternative emptying device.

FIG. 4 shows a perspective view of the outlet screw or drain plug 16 of the alternative emptying system according to FIGS. 3a and 3b. Again, components corresponding to the previous figures are labeled with the same reference numerals. The sealing plate 36 which is arranged concentrically in the outlet screw 16 is held by retaining pins 39, which are arranged between the snap hooks 34 around the circumference of the outlet screw 16 to thereby prevent skewing of the sealing plate 36 together with the gasket 37 in the carrier module 14. Tilting here would lead to a leakage in the area of the passage boreholes 38, which should be avoided.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A liquid filter comprising at least one replaceable filter and a carrier module, said replaceable filter having a filter medium permanently enclosed in a housing vessel, said housing vessel comprising a housing with an opening at one end and an end cover inseparably secured to said housing closing over and sealing said opening, said end cover including an inlet and an outlet for a liquid to be filtered, said housing vessel having a downwardly oriented opening attached to the carrier module in a sealed manner, wherein said filter medium is arranged in a sealed manner in said housing vessel between said inlet and said outlet, wherein said housing vessel and filter medium are replaced as a unit, said liquid filter further comprising a semiautomatic emptying device for the replaceable filter which opens at least one passage to empty the replaceable filter when prompted by an external operation and automatically closes said at least one passage after the replaceable filter has been emptied.

2. A liquid filter according to claim 1, wherein said liquid filter is an oil filter arranged in a lubricating oil circuit of an internal combustion engine.

3. A liquid filter according to claim 2, wherein when the internal combustion engine is operating, the semiautomatic emptying device sealingly separates an unfiltered oil area and a filtered oil area of the replaceable filter from each other and from an unpressurized liquid outlet, and wherein after actuation of the emptying device when the internal combustion engine has been stopped, the unfiltered oil area and the filtered oil area of the replaceable filter are connected to the liquid outlet such that filtered and unfiltered oil flow out of the replaceable filter and out of part of the carrier module through the liquid outlet.

4. A liquid filter according to claim 2, wherein the semiautomatic emptying device sealingly separates at least two areas within the carrier module from one another, a first of said at least two areas communicating with the ambient environment such that it is subjected to ambient pressure, and a second of said at least two areas being in communication with oil in the filter;

wherein during emptying of the filter said second area is subjected to oil which is not under pressure because the engine is not running; and wherein when the engine is restarted after emptying of the filter, oil pressure builds up in said second area such that said oil pressure in said second area automatically resets the emptying device to the closed position against the ambient pressure in said first area.

5. A liquid filter according to claim 1, wherein the semiautomatic emptying device comprises an axially reciprocatable member which carries a sealing member and opens or closes at least one channel in the carrier module as a result of a respective axial displacement of the reciprocatable member.

6. A liquid filter according to claim 1, wherein the semiautomatic emptying device comprises an axially reciprocatable rod which carries a radial gap seal, said radial gap seal opening or closing at least one channel in the carrier module as a result of a respective axial displacement of the reciprocatable rod.

7. A liquid filter according to claim 1, wherein the semiautomatic emptying device is manually operable without the use of tools or application of any supplemental external force.

8. A liquid filter according to claim 2, wherein the semiautomatic emptying device is operably connected to an actuator which operates the emptying device upon receipt of signal indicating that the filter should be emptied.

9. A liquid filter according to claim 1, wherein said emptying device comprises a spring arranged such that when the emptying device is actuated to initiate emptying, a spring force acting on the emptying device is generated which automatically resets the emptying device to the closed position when the emptying of the filter is completed.

10. A liquid filter according to claim 1, wherein an inspection glass is provided in the liquid filter to enable visual determination of the liquid level in the replaceable filter or carrier module.

11. A liquid filter according to claim 1, further comprising a liquid level sensor in the carrier module operably connected to an external display for indicating the liquid level in the filter.

12. A liquid filter according to claim 1, wherein a liquid level sensor is provided in the carrier module, said sensor being operably connected to said emptying device to open or close said emptying device in response to a respective liquid level indicating signal.

13. A liquid filter according to claim 1, wherein a liquid level sensor is provided in the carrier module, said sensor being operably connected to said emptying device to open or close said emptying device in response to a respective liquid level indicating signal.

14. A liquid filter comprising at least one replaceable filter having a filter medium permanently enclosed in a housing vessel, said housing vessel comprising a housing with an opening at one end and an end cover inseparably secured to said housing closing and sealing over said opening, said end cover including an inlet and an outlet for a liquid to be filtered, said housing vessel with a downwardly oriented opening sealingly attached to an underlying carrier module, said filter medium arranged in a sealed manner in said housing vessel between the inlet and outlet, wherein said carrier module comprises an externally actuatable emptying device operable in a first operation to open a passage to empty the replaceable filter and in a second operation to close said passage after the replaceable filter has been emptied.

15. A liquid filter according to claim 14, wherein said liquid filter is an oil filter arranged in a lubricating oil circuit of an internal combustion engine.

16. A liquid filter according to claim 14, wherein the emptying device comprises a rotatable outlet sealing screw which is screwed from the outside into the carrier module to a first operating position to sealingly close liquid chambers in the interior of the carrier module, and wherein upon screwing out of the outlet screw, the outlet screw is axially displaced to a second operating position to connect the liquid chambers to a drain system in order to empty the filter.

17. A liquid filter according to claim 16, wherein the rotatable outlet sealing screw has an axial seal at one end for separating an unfiltered liquid chamber and a filtered liquid chamber from each other and from the drain system, and also has a radial seal for sealing the interior of the carrier module relative to the external environment, said radial seal being arranged to ensure a seal in each operating position of the axially displaceable sealing screw.

18. A liquid filter according to claim 16, wherein said outlet sealing screw is provided with loss-prevention device which permits easy insertion of the screw into the carrier module and prevents complete removal of the screw from the carrier module without destroying the screw.

19. A liquid filter according to claim 14, wherein an inspection glass is provided in the liquid filter to enable visual determination of the liquid level in the replaceable filter or carrier module.

20. A liquid filter according to claim 14, further comprising a liquid level sensor in the carrier module operably connected to an external display for indicating the liquid level in the filter.

21. A liquid filter according to claim 14, wherein the first and second operations are individually manually initiated.

* * * * *